A. J. HEFLIN.
Wheel-Cultivator.
No. 64,668.                                           Patented May 14, 1867.
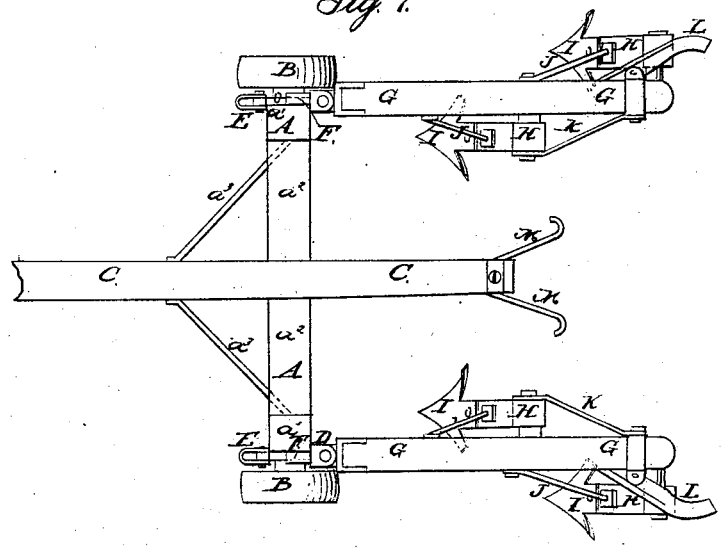
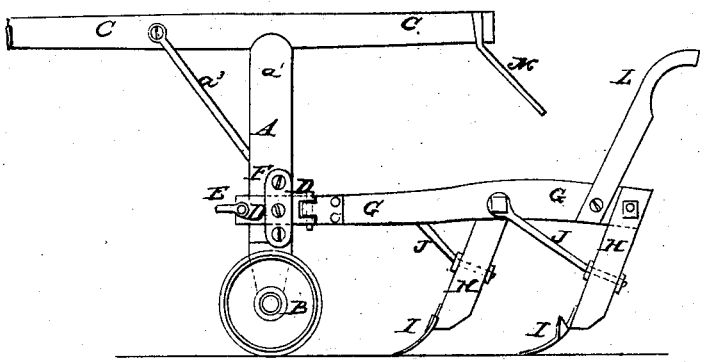

United States Patent Office.

A. T. HEFLIN, OF MONMOUTH, ILLINOIS.

Letters Patent No. 64,668, dated May 14, 1867.

CULTIVATORS.

The Schedule referred to in these Letters Patent and making part of the same.

TO ALL WHOM IT MAY CONCERN:

Be it known that I, A. T. HEFLIN, of Monmouth, in the county of Warren, and State of Illinois, have invented a new and useful improvement in Cultivator; and I do hereby declare that the following is a full, clear, and exact description thereof, which will enable others skilled in the art to make and use the same, reference being had to the accompanying drawings, forming part of this specification, in which—

Figure 1 is a top or plan view of my improved cultivator.

Figure 2 is a side view of the same.

Similar letters of reference indicate like parts.

My invention has for its object to furnish an improved cultivator, by means of which two rows may be cultivated at the same time; and it consists in the form of the shovels, and in the manner in which the forward ends of the beams are connected to the vertical bars of the frame.

A is the frame of the cultivator, to the lower ends of the vertical side-bars $a^1$ of which are attached wheels B, upon which the cultivator is carried. The vertical bars $a^1$ should be of such a length that the horizontal bar $a^2$ attached to and connecting their upper ends may be at a sufficient height to pass over the plants being cultivated. C is the tongue, which is securely attached to the horizontal bar $a^2$, and connected to the vertical bars $a^1$ by the braces $a^3$. To the outer side of the lower end of each of the vertical side-bars $a^1$ is pivoted the bar D, to the forward end of which is adjustably attached the clevis E, to which the draught is applied. The bar D is secured in place by a strap or keeper, F, through which, and through the bar D, the pivoting pin or bolt passes. To the rear end of the bar D is hinged or pivoted the forward end of the cultivator beam G, in such a way that it may be free to move horizontally in either direction, as shown in figs. 1 and 2. To the rear part of the beams G, upon opposite sides, are attached the upper ends of the uprights H, to which the shovels I are attached. These uprights are secured at a little distance from the beams G by the interposition of blocks as shown in fig. 1, so as to bring the shovels into a proper operating position, and they are further secured and strengthened by the braces J and K. The shovels I are made with wings, as shown in fig. 1, the outer wing of each shovel being bent or turned up, as shown in the drawings, with a curve, somewhat similar to the curve of the mould-board of a plough, so as to throw the dirt more effectively around the stalks of the plants. To the rear parts of the beams G are attached the handles L by which the machine is guided. To the rear end of the tongue C are attached hooks M, projecting to the side and rear, upon which the ploughs may be hung by passing the braces K over said hooks, allowing the machine to be transported upon the wheels B. In using the machine the row over which the machine passes is finished, and the two rows adjacent to it are half finished, the cultivator doing an amount of work sufficient to cultivate two entire rows each time it crosses the field.

What I claim as new, and desire to secure by Letters Patent, is—

1. Forming the shovels I with wings, the outer wing of each shovel being curved or turned up, substantially as herein shown and described, and for the purpose set forth.

2. The combination of the pivoted bar D with the beam G, and vertical bar $a^1$ of the frame A, substantially in the manner herein shown and described, and for the purpose set forth.

A. T. HEFLIN.

Witnesses:
W. W. YOUNG,
P. L. STEWART.